United States Patent [19]

Dolla

[11] Patent Number: 5,169,172
[45] Date of Patent: Dec. 8, 1992

[54] MOUNTING ARRANGEMENT FOR A SAFETY STEERING COLUMN IN A PASSENGER VEHICLE

[75] Inventor: Franz Dolla, Isenbüttel, Fed. Rep. of Germany

[73] Assignee: Volkswagen AG, Fed. Rep. of Germany

[21] Appl. No.: 714,449

[22] Filed: Jun. 13, 1991

[30] Foreign Application Priority Data

Jun. 13, 1990 [DE] Fed. Rep. of Germany ....... 4018888

[51] Int. Cl.⁵ ............................................. B62D 1/11
[52] U.S. Cl. ..................................... 280/777; 280/784
[58] Field of Search ................ 280/777, 784; 200/779, 200/780

[56] References Cited

U.S. PATENT DOCUMENTS

| | | | |
|---|---|---|---|
| 4,337,967 | 7/1982 | Yoshida et al. | 280/777 |
| 4,655,475 | 4/1987 | Van Gelderen | 280/777 |
| 4,895,390 | 1/1990 | Fujikawa et al. | 280/777 |

FOREIGN PATENT DOCUMENTS 3544345 7/1986 Fed. Rep. of Germany .

*Primary Examiner*—Kenneth R. Rice
*Attorney, Agent, or Firm*—Brumbaugh, Graves, Donohue & Raymond

[57] ABSTRACT

In the described embodiments, a telescoping safety steering column is supported by two mounts and is inclined to the horizontal so that a change in distance between the steering column mounts upon collision will normally cause a change of position of the steering wheel and/or a steeper inclination of the steering column centerline. To avoid this, a rearwardly inclined control member is connected at a lower end to an inclined floorboard and at its upper end to the support for the lower part of the steering column, thereby transmitting relative rearward motion of the floorboard to the lower steering column mount and forcing the latter upward. Thus, the steering column centerline always remains at the same inclination.

12 Claims, 2 Drawing Sheets

MOUNTING ARRANGEMENT FOR A SAFETY STEERING COLUMN IN A PASSENGER VEHICLE

BACKGROUND OF THE INVENTION

This invention relates to a mounting arrangement for a collapsible safety steering column in a passenger motor vehicle.

A safety steering column in a passenger vehicle is designed so that, in the vent of a frontal collision, there will be no horizontal motion of the steering wheel towards the operator, at least in the lower speed range. For this purpose, the steering column preferably has a telescoping construction, and is mounted on upper and lower steering column supports. The support for the upper steering column portion is connected to frame parts arranged for utmost rigidity in a collision, while the lower steering column support is mounted on vehicle parts which can yield. Accordingly, in the event of a collision, the lower steering column bearing will move toward the interior of the vehicle. During this motion, the lower steering column support will not move along the principal axis of the steering column, but at an angle to that axis. As a result, when the lower support moves, there will be a change in the angle of inclination of the steering column and hence an upward motion of the steering wheel. This results in an unfavorable position of the steering wheel in relation to the operator's head. If the operator's head makes contact with the steering wheel when the operator's seatbelt is buckled, it should make contact essentially with only the uppermost rim of the steering wheel.

The displacement of the steering column described above will lead to an impact of the head upon the center or the lower rim of the steering wheel. In vehicles with an air bag mounted in the steering wheel, there is similarly an altered and moreover unfavorable action upon the operator. In that case, the operator's chest will impact the lower rim of the steering wheel, and will not be supported only by the air bas, as intended.

German Offenlegungsschrift No. 3 544 345 discloses a steering column that will swing following the response of a collision sensor. In that case, the risk of a malfunction is a disadvantage as is the requirement for auxiliary energy to execute the swinging motion.

SUMMARY OF THE INVENTION

Accordingly, it is an object of the present invention to provide a mounting arrangement for a safety steering column in a passenger vehicle which overcomes the above-mentioned disadvantages of the prior art.

Another object of the invention is to provide a mounting arrangement for a safety steering column such that the aforementioned disadvantages will be avoided and, at the same time, an upward motion of the steering wheel in a collision is prevented.

These and other objects of the invention are attained by providing a mounting arrangement for a safety steering column in which the upper steering column support is rigidly retained in position and the lower steering column supports is movable upwardly as the steering column collapses upon frontal impact. This upward motion is effected by a specially designed control member. The disposition of the supports and the control member in relation to each other must be such that the upward motion of the steering wheel is just compensated by the upward motion of the lower steering column mount. For this purpose, the control member is effectively connected at its upper end to the lower steering column mount, and is supported at its lower end against an inclined floorboard provided in downward continuation of the front bulkhead.

The control member may take the form of a tubular bar or a composition section of sheet metal or the like. In a front end collision, the floorboard normally will be forced into the interior of the vehicle. If, at the same time, an upward motion of the floorboard occurs, the control member will move upwardly to the same extent. To be effective in case of an exclusively horizontal travel of the inclined floorboard, the control member may be tilted from the vertical with its upper end toward the rear so that in the vent that the floorboard moves horizontally to a greater extent than the lower steering column support, a change in the inclination of the control member, and hence a lifting of the lower steering column support will automatically occur.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
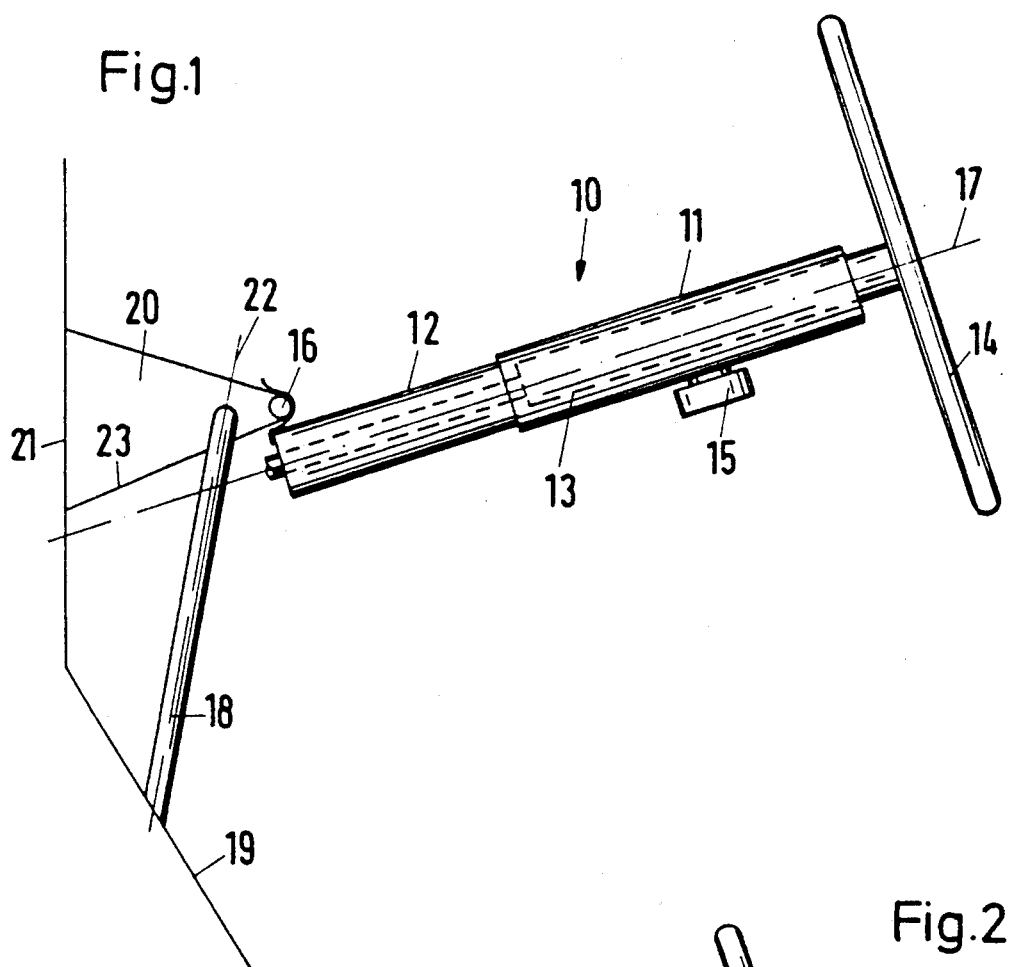
FIG. 1 is a schematic side view showing a typical safety steering column mounting arrangement according to the invention showing a control member, steering column and a steering wheel.

In the typical mounting arrangement shown schematically in FIG. 1, a safety steering column 10 has an upper steering column tube 11 and a lower steering column tube 12 which is capable of telescoping into the upper tube. A bipartite steering shaft 13, accommodated inside of the upper and lower tubes 11 and 12, has a steering wheel 14 at its upper end and is connected at the lower end, that is to say, where it protrudes from the lower steering column tube 12, to a steering gear (not shown).

The upper steering column tube 11 is rigidly connected by way of an upper steering column support 15 to the frame of the vehicle, which is not illustrated. The upper support 15 is preferably connected to a frame part having the greatest stability in the event of a collision, for example, the so-called A-column, which is the frontmost upright of the passenger compartment. To complete the mounting of the safety steering column 10, a lower column support 16 is also provided at the lower end portion of the lower steering column tube 12.

In the event of a "crash", that is, a frontal collision of the vehicle with an obstacle, the position of the steering wheel 14 in the passenger compartment should not change. To that end, the upper steering column support 15 is connected, as described above, to the A-column. Upon frontal impact, the compression of the front portion of the vehicle may force the lower steering column support 16, together with the lower steering column tube 12 and the corresponding portion of the steering shaft 13, rearwardly toward the steering wheel 14.

In the above-mentioned arrangement shown in German offenlegungsschrift No. 3 544 345, the lower steering column support 16 remains at about the same level as it moves rearwardly. This results, upon the telescoping of the safety steering column 10, in tilting the angle of the axis 17 of the steering column upwardly. To avoid this effect, the mounting arrangement shown in FIG. 1 includes an upwardly extending control member 18, such as a tube, a bar section or a rod. This control member abuts an inclined floorboard 19 at its lower end, while its upper end is connected to a lug 20 projecting from a front bulkhead 21.

The floorboard 19 and the bulkhead 21 are joined together or, alternatively, the floorboard 19 is formed by the lower portion of the bulkhead 21. The control member 18 may alternatively be connected to a portion of the bulkhead other than the floorboard. It is only essential that the control member 18 is disposed in a region that will be more extensively deformed in a collision than is the mounting of the lug 20 or the lower steering column support 16. The control member 18 is preferably pivotally attached to the lug 20 near the lower steering column support 16. The longitudinal centerline 22 of the control member 18 is slightly inclined toward the rear, as shown in FIG. 1, i.e., with its lower end farther forward (in the direction of motion) than its upper end.

Figure 2:
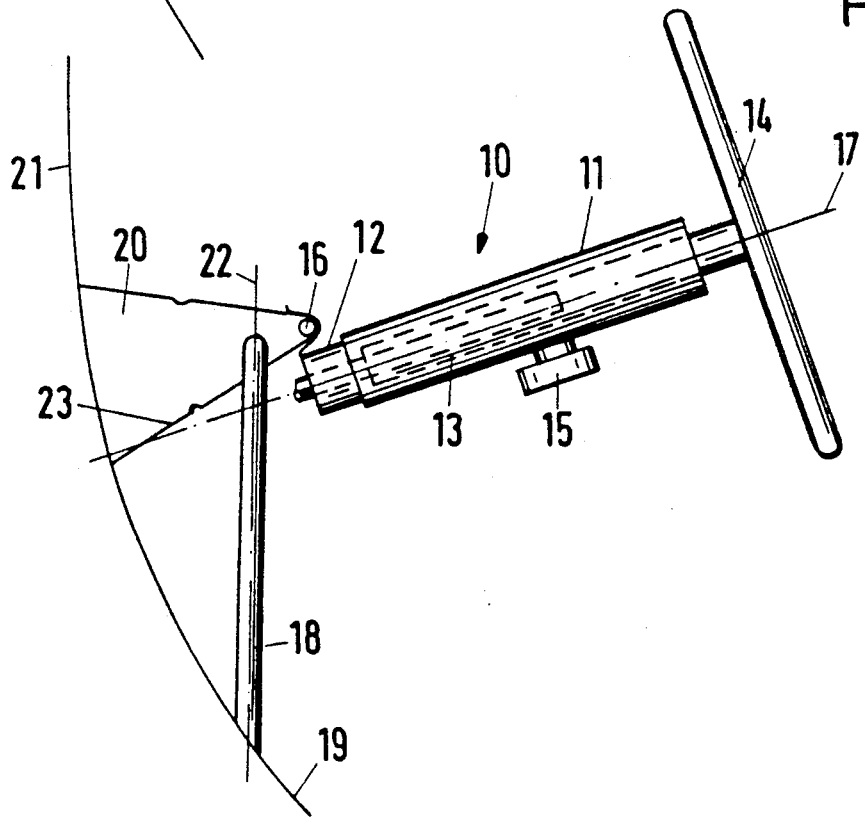
FIG. 2 is a schematic side view of the mounting arrangement according to FIG. 1 after a collision, with the steering column telescoped and the front bulkhead deformed.

FIG. 2 illustrates the mounting arrangement according to FIG. 1 in the deformed state following a collision. The bulkhead 21 and the inclined floorboard 19 connected at its lower end have been deformed by an impact. Specifically, the floorboard 19 has been forced into the interior of the vehicle. Hence the lower portion of the control member 18 has moved rearwardly with respect to its upper end, and its longitudinal centerline 22 is more nearly perpendicular. Consequently, the lug 20 connected to the control member 18 has been raised relative to the position shown in FIG. 1. This is evident from a comparison of the steering column centerline 17 with the lower edge 23 of the lug 20. The upward motion of the lug 20 moves the lower steering column support 16 with it in an upward direction, compensating for the telescoping of the safety steering column 10 so that tilting of the steering column centerline 17 is avoided. As a result, the steering column centerline 17 is in more or less the same angular position after impact (FIG. 2) as before impact (FIG. 1).

The desired effect is further enhanced by articulated connections of the steering column supports 15 and 16 of the control member 18 to the lug 20 and to the floorboard 19, and of the lug 20 relative to the bulkhead 21. In addition, there should be an adaptation of the geometry to the deformations to be expected. In the example here described, it is assumed that specifically the floorboard 19 will move farther into the interior of the vehicle than the bulkhead 21 in the event of a collision.

Figure 3:
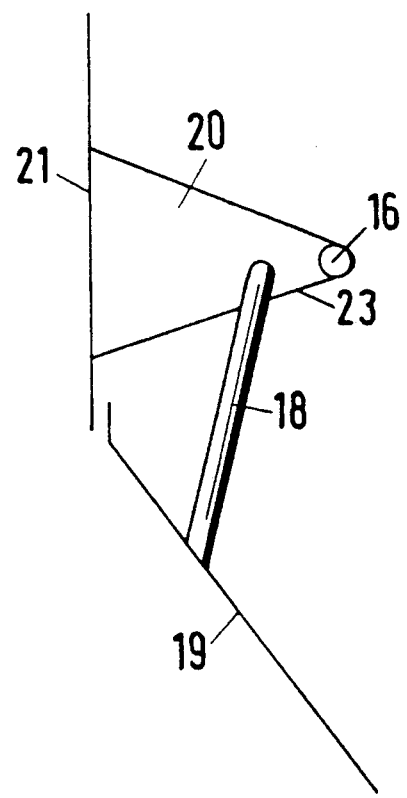
FIG. 3 is a schematic side view illustrating another embodiment of the invention in which the floorboard is separated from the bulkhead.

FIG. 3 shows a slightly modified embodiment. Here the floorboard 19 is disconnected from the bulkhead 21, so that a largely independent motion or deformation of each of those two parts can take place.

Although the invention has been described herein with reference to specific embodiments, many modifications and variations therein will readily occur to those skilled in the art. Accordingly, all such variations and modifications are included within the intended scope of the invention.

I claim:

1. A mounting arrangement for a safety steering column in a passenger motor vehicle comprising telescoping upper and lower steering column tubes, first support means for supporting the upper steering column tube in substantially fixed position in the direction of the steering column centerline in the event of a collision, second support means for supporting the lower steering column tube, the second support means being disposed in the region of a bulkhead in the front portion of a passenger compartment, and a control member extending upwardly to the second support means at an angle from an inclined floorboard which is rearwardly movable into the vehicle compartment to cause the second support means to be moved upwardly by the control member.

2. A mounting arrangement according to claim 1 wherein the first support means is connected to the A-column located toward the front of the vehicle.

3. A mounting arrangement according to claim 1, including a lug to which the second support means is connected which is movable upwardly by the control member at least in the region of the lower steering column mount upon relative rearward motion of the inclined floorboard.

4. A mounting arrangement according to claim 1 wherein the steering column is pivotally supported by at least one of the first and second support means.

5. A mounting arrangement according to claim 3 wherein the control member is pivotally supported at least at the end connected to the lug.

6. A mounting arrangement for a safety steering column in a passenger motor vehicle comprising telescoping upper and lower steering column tubes, first support means for supporting the upper steering column tube in substantially fixed position in the direction of the steering column centerline in the event of a collision, second support means for supporting the lower steering column tube, the second support means being disposed in the region of a bulkhead in the front portion of a passenger compartment, and a control member extending upwardly to the second support means at an angle from an inclined floorboard which is rearwardly movable into the vehicle compartment including a bulkhead connected to the second support means and wherein the floorboard is movable independently of the bulkhead.

7. A mounting arrangement for a safety steering column in a passenger motor vehicle comprising first support means for supporting an upper part of the steering column in substantially fixed position in the direction of the steering column centerline in the event of a collision, second support means for supporting a lower part of the steering column, the second support means being disposed in the region of a bulkhead in the front portion of a passenger compartment, and a control member extending upwardly to the second support means at an angle from an inclined floorboard which in the event of a collision is rearwardly movable into the vehicle compartment including a bulkhead connected to the second support means and wherein the floorboard is movable independently of the bulkhead.

8. A mounting arrangement for a safety steering column in a passenger motor vehicle comprising first support means for supporting an upper part of the steering column in substantially fixed position in the direction of the steering column centerline in the event of a collision, second support means for supporting means being disposed in the region of a bulkhead in the front portion of a passenger compartment, and a control member extending upwardly to the second support means at an angle from an inclined floorboard which in the event of a collision is rearwardly movable into the vehicle compartment to cause the second support means to be moved upwardly by the control member.

9. A mounting arrangement according to claim 8, including a lug to which the second support means is connected which is movable upwardly by the control member at least in the region of the lower steering column mount upon relative rearward motion of the inclined floorboard.

10. A mounting arrangement according to claim 8 wherein the steering column is pivotally supported by at least one of the first and second support means.

11. A mounting arrangement according to claim 7 wherein the control member is pivotally supported at least at one end thereof.

12. A mounting arrangement according to claim 8 wherein the first support means is connected to a rigid frame member of the vehicle.

* * * * *

UNITED STATES PATENT AND TRADEMARK OFFICE
CERTIFICATE OF CORRECTION

PATENT NO. : 5,169,172
DATED : December 8, 1992
INVENTOR(S) : Franz Dolla

It is certified that error appears in the above-identified patent and that said Letters Patent is hereby corrected as shown below:

Column 1, line 10, "vent" should read --event--;

Column 1, line 40, "air bas" should read --air bag--;

Column 1, line 61, "supports" should read -support--;

Column 2, line 6, "composition" should read --composite--;

Column 2, line 14, "vent" should read --event--;

Column 4, line 66, "supporting" should read --supporting a lower part of the steering column, the second support--;

Column 6, line 6, "claim 7" should read --claim 9--.

Signed and Sealed this

Sixteenth Day of November, 1993

BRUCE LEHMAN

Attest:

Attesting Officer

Commissioner of Patents and Trademarks